United States Patent [19]

Pynenburg et al.

[11] Patent Number: 5,429,890
[45] Date of Patent: Jul. 4, 1995

[54] CATHODE-ACTIVE MATERIAL BLENDS OF $Li_xMn_2O_4$

[75] Inventors: Rory Pynenburg; Jeremy Barker, both of San Jose, Calif.

[73] Assignee: Valence Technology, Inc., San Jose, Calif.

[21] Appl. No.: 194,195

[22] Filed: Feb. 9, 1994

[51] Int. Cl.⁶ .................. H01M 6/18; H01M 4/32; H01M 4/50
[52] U.S. Cl. ................... 429/192; 429/223; 429/224
[58] Field of Search .............. 429/224, 223, 192

[56] References Cited

U.S. PATENT DOCUMENTS

| | | |
|---|---|---|
| 4,310,609 | 1/1982 | Liang et al. |
| 4,770,960 | 9/1988 | Nagaura et al. |
| 5,028,500 | 7/1991 | Fong et al. |
| 5,053,297 | 10/1991 | Yamahira et al. |
| 5,069,683 | 12/1991 | Fong et al. |
| 5,135,732 | 8/1992 | Barboux et al. |
| 5,196,279 | 5/1993 | Tarascon. |

FOREIGN PATENT DOCUMENTS

0486950A1 5/1992 European Pat. Off.
WO92/13367 8/1992 WIPO.

OTHER PUBLICATIONS

Tarascon, J. M., "Li Metal-Free Rechargeable Batteries Based on $Li_{1+x}Mn_2O_4$ Cathodes ($0 \leq x \leq 1$ and Carbon Anodes", J. Electrochem. Soc., 138: Oct. 1991.
Tarascon et al., "The Spinel Phase of $LiMn_2O_4$ as a Cathode in Secondary Lithium Cells", J. Electrochem. Soc., 138: (Oct. 1991).
Guyomard, D. and Tarascon J. M, "Li Metal-Free Rechargeable $LiMn_2O_4$/Carbon Cells: Their Understanding and Optimization", J. Electrochem. Soc., 139 (Apr. 1992).
Tarascon, J. M. and Guyomard, D. G., "The $Li_{1+x}Mn_2O_4$/CD Rocking-Chair System: A Review", Electrochemica Acta, 38:000–000 (1993) (no month).

Primary Examiner—John S. Maples
Attorney, Agent, or Firm—Robert E. Krebs

[57] ABSTRACT

A solid secondary lithium electrochemical cell comprises a physical mixture of $Li_xMn_2O_4$(spinel) and at least one lithiated metal oxide selected from the group consisting of $Li_xNiO_2$ and $Li_xCoO_2$ wherein $0 < x \leq 2$. The cell is particularly suitable for use with anodes composed of anodic carbon materials.

10 Claims, 3 Drawing Sheets

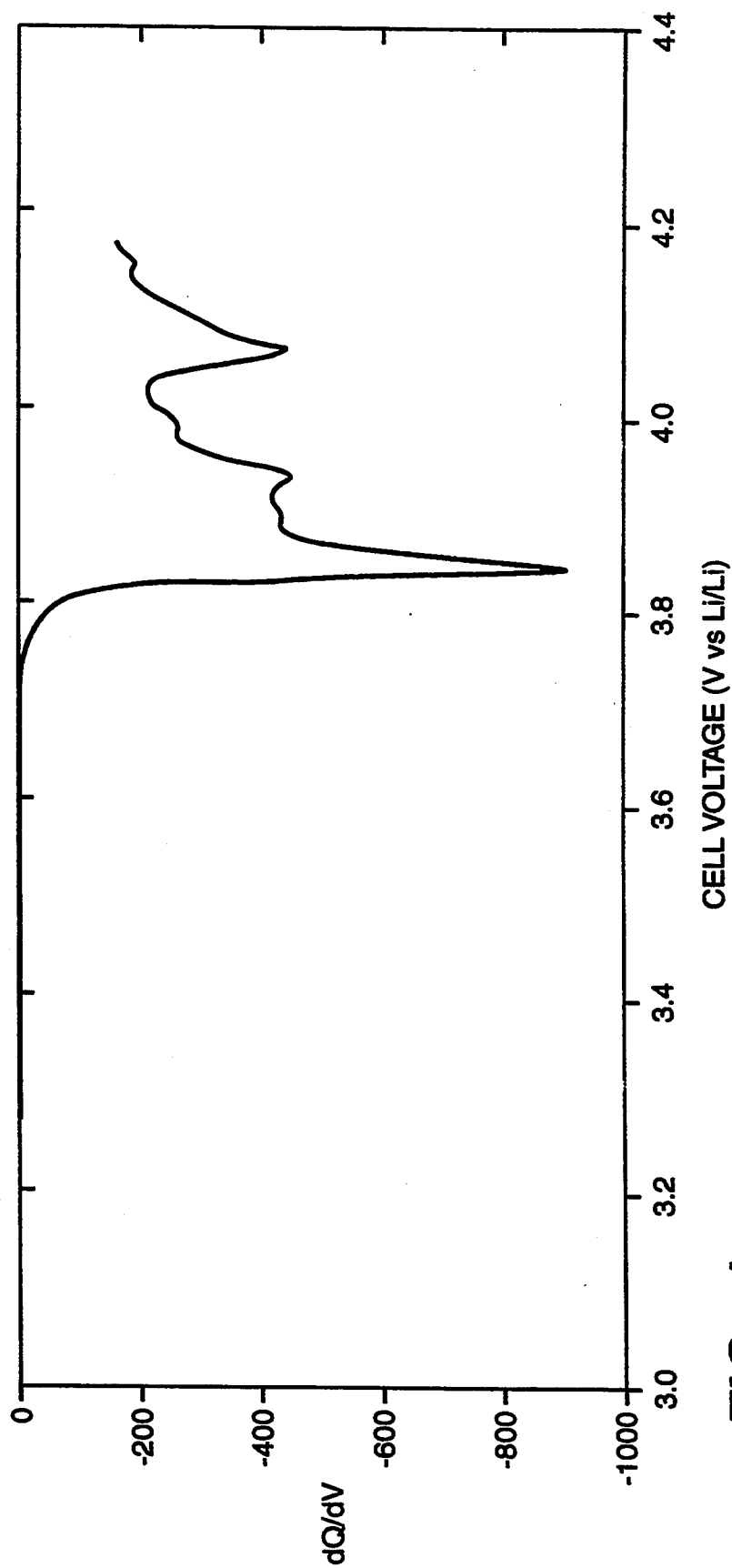
FIG._1

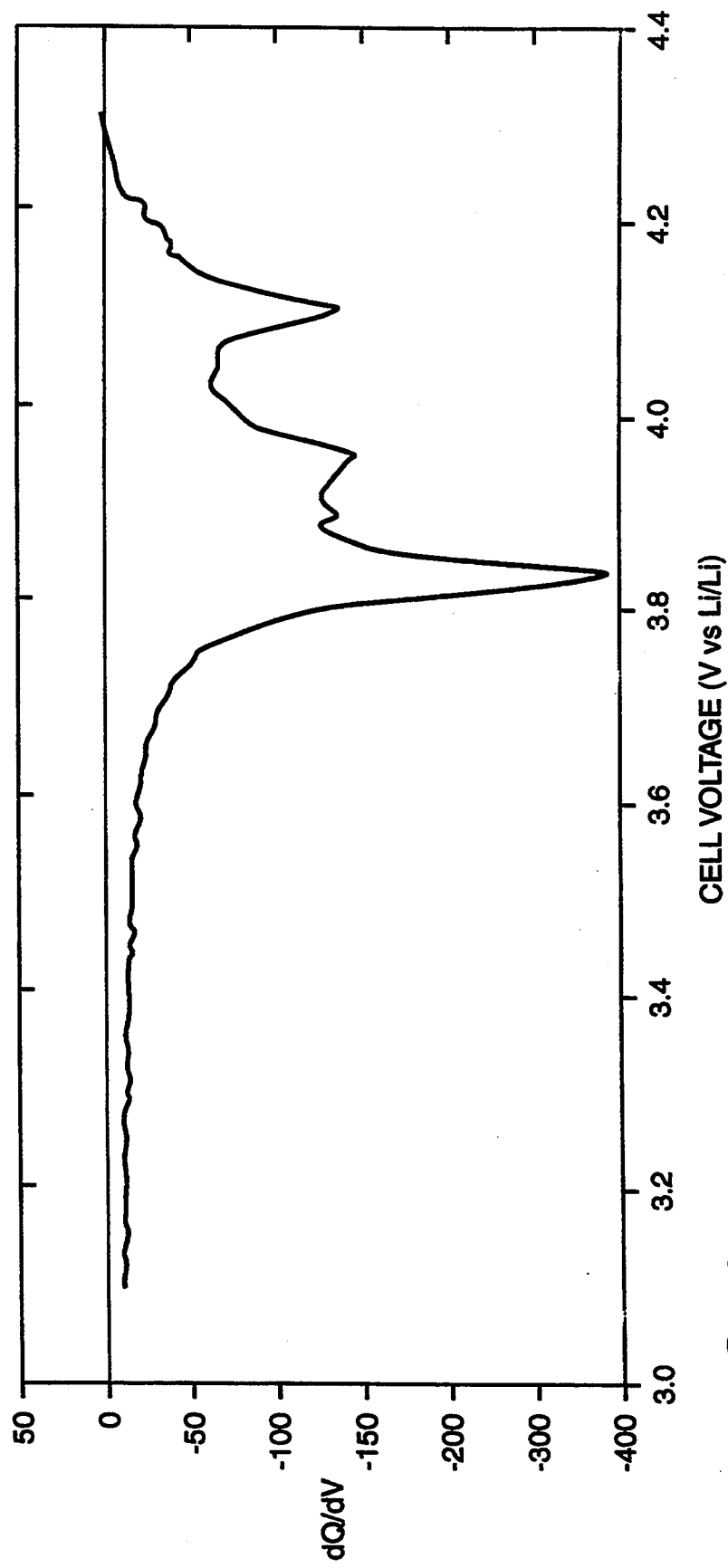
FIG._2

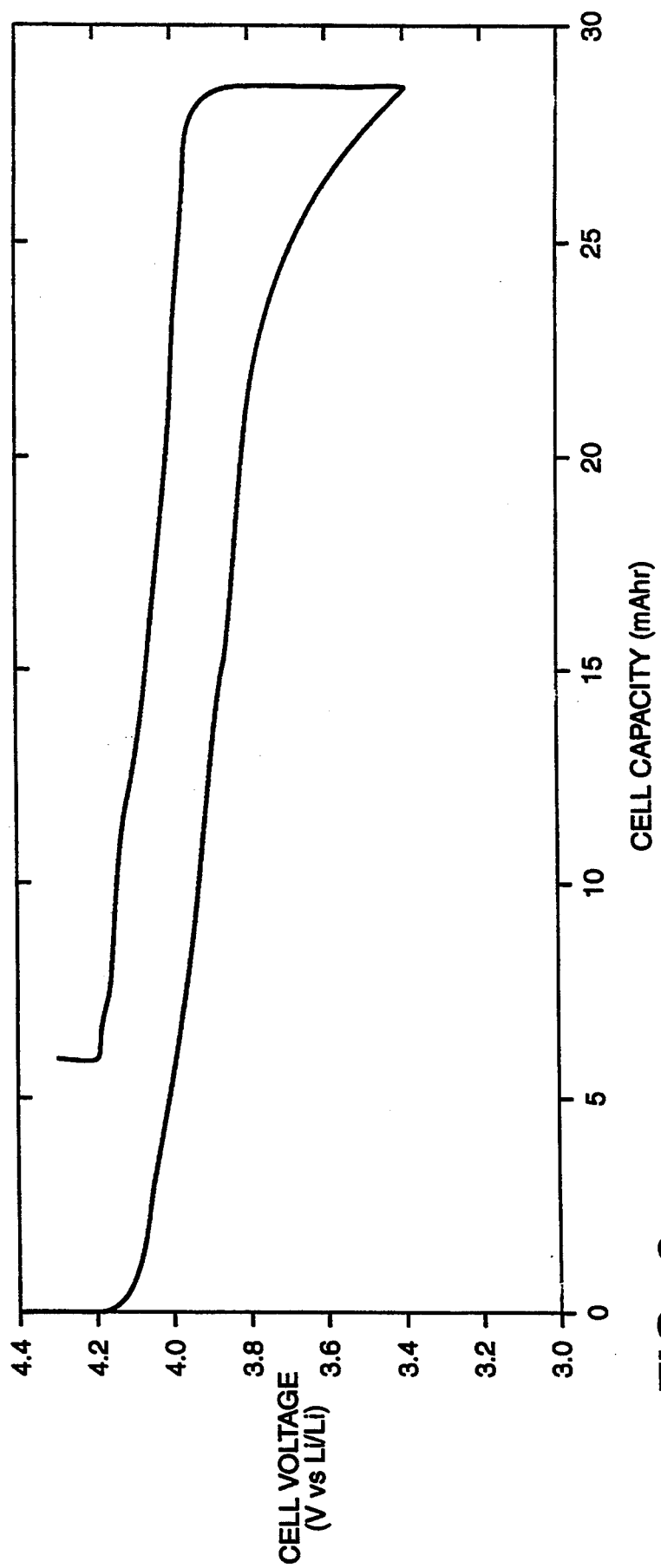
FIG._3

CATHODE-ACTIVE MATERIAL BLENDS OF $Li_xMn_2O_4$

FIELD OF THE INVENTION

This invention relates to the composition of higher voltage and higher capacity solid secondary lithium electrochemical cells. Specifically, the invention relates to the composition of intercalation cathodes and anodes.

BACKGROUND OF THE INVENTION

Secondary lithium batteries having an intercalation compound as cathode and a lithium metal anode have been extensively studied because of their commercial potential. The bulk of these studies have been concerned with liquid electrolyte cells, having cell voltages in the vicinity of 3.0 volts, which is readily obtainable with vanadium oxide intercalation cathodes and lithium metal anodes. Solid electrolyte cells, particularly, solid polymeric electrolyte cells, have also seen increasing interest. While the high specific capacity (about 380 $AhKG^{-1}$) of a lithium cells and their high voltage provide energy densities higher than other electrochemical systems, it is believed that these cells can be improved in several ways. Specifically, we look to cathodes of higher voltage, greater than 3.6 volts, relative to the reference electrode (Li/Li+), smoother voltage declines during discharge of the cell, higher charge capacity, and the replacement of lithium metal anodes with intercalation anodes. In the later case, the cell voltage is the difference in electrochemical potential of lithium within the two intercalating electrodes. This electrode composition has been called the "rocking chair" battery because lithium ions move back and forth between the intercalation compounds during charge/discharge cycles. Potential drawbacks to rocking chair cells include lower output voltage and energy density compared to lithium metal cells. The use of compounds which reversibly intercalate lithium at higher voltage, such as, $LiNiO_2$, $LiCoO_2$ and $LiMn_2O_4$ may ameliorate these drawbacks. Recently, several manufacturers have expressed their interest in developing batteries based on the use of one of the higher voltage intercalation materials in cathodes and a form of carbon as the intercalation anode.

J. M. Tarascon et al., Electrochim. Acta 38 (1993) 1; J. Electrochem. Soc. 138 (1991) 2864; 139 (1992) 937; 138 (1991) 2859; U.S. Pat. Nos. 5,135,732 and 5,196,279 review the method of making and the use of $Li_xMn_2O_4$ ($0<X\leq 2$) intercalation electrodes in cells containing liquid electrolytes and lithium metal or carbon anodes, e.g. $Li_xC_6$ ($0\leq X\leq 1$). The disclosure of each of the foregoing references is incorporated herein in its entirety.

The use of intercalation cathodes or anodes composed of mixed oxides and other materials has led to conflicting claims in the technical literature of lithium liquid electrolyte cells. U.S. Pat. No. 4,310,609 discloses a composite cathode material comprising at least one metal oxide incorporated in the matrix of a host metal oxide for use in a non-aqueous liquid electrochemical cell with a lithium metal anode. The metal oxides are thermally treated in the mixed state. The cathode material of this disclosure can be constructed by the chemical addition, reaction, or otherwise intimate contact of various metal oxides or metal elements during thermal treatment in mixed states. Alternatively, the metal oxide may be the product of the thermal treatment of a single metal oxide. U.S. Pat. No. 4,770,960 reports a lithium liquid electrolyte cell using a cathode active material which is the complex oxide $LiCo_{1-x}Ni_xO_2$ made from calcined mixtures of $LiCO_3$, $CoCO_3$ and $NiCO_3$. The cell voltage was reported to be less than 2.0 volts vs. a Li/Li+ anode. Furthermore, the discharge capacity decreased with the increase in nickel content for $x>0.27$. The recommended cathode active materials were those having $0<x\leq 0.27$. U.S. Pat. No. 5,053,297 discloses cathode active materials which contain as a primary active material a first lithium compound having an electrochemical potential which is more noble than the electrochemical potential of the current collector, and an auxiliary active material which is a second lithium compound having an electrochemical potential which is more base than the electrochemical potential of the current collector. Examples include physical mixtures of $LiNiO_2$ and $LiCoO_2$, as well as, chemical mixtures i.e. $LiNi_{0.95}Co_{0.05}O_2$, for use in lithium liquid electrochemical cells. The electrolyte may alternatively be a gel electrolyte. The addition of auxiliary active material decreases the battery capacity. The preferred anode is a carbon material. European patent application 91119471.0 (Publication 0486950Al) discloses a liquid electrolyte secondary lithium cell having an intercalation carbon anode and a cathode which comprises a lithium-containing metal complex oxide of the formula $Li_xMO_2$, wherein x is $0.5\leq x\leq 1$ and M is selected from the group Co, Ni and Mn. Examples of the metal complex oxides include $LiCoO_2$, $LiNiO_2$, $LiNi_yCo_{1-y}O_2$, ($0<y<1$), $LiMn_2O_4$ and mixtures thereof. The cathode active material is ordinarily used in combination with a conductive agent such as graphite and a binder therefor such as polyvinylidene fluoride. The average discharge voltage of the cell is about 3.6 volts. Application PCT/US92/00348 (Publication WO92/13367) describes a secondary lithium cell with liquid electrolyte and intercalation electrodes consisting of $Li_xMn_2O_4$ (cathode) $1\leq x\leq 2$, and $Li_xC$(carbon anode) $0\leq x\leq 1$. U.S. Pat. Nos. 5,069,683 and 5,028,500 report the use of intercalation carbon electrodes in liquid electrolyte secondary lithium electrochemical cells characterized by the "degree of graphitization" of the carbon: essentially, a mixed phase carbon electrode consisting of a mixture selected from carbon black, graphite and coke. Cathode active materials suggested for this cell are $LiNiO_2$, $LiCoO_2$, and complex oxides of the same. The disclosures of each of the foregoing references is incorporated herein in its entirety.

It is characteristic of the higher capacity intercalation compounds used as active cathode materials that each compound accepts lithium ions at a series of unique voltages. Typically, the discharge curves include a series of inflections. $LiMn_2O_4$ produces voltage plateaus at 4.1 volts, 3.9 volts and 2.9 volts, (versus Li/Li+) on cell discharge. $LiCoO_2$ produces a voltage plateau at 3.7 volts. It would be advantageous if a continuous and smooth voltage profile over a relatively large voltage range could be obtained for the solid lithium cell. Furthermore, it would be highly desirable to tailor the voltage profile to the requirements of the cell and its use.

During charging of an electrochemical lithium cell containing a carbon anode, the lithium ions are intercalated from the cathode and intercalated into the carbon anode. However, 20% of the lithium ions are irreversibly intercalated into the carbon anode. It would be desirable to use a cathode material of higher lithium capacity in conjunction with carbon anodes.

SUMMARY OF THE INVENTION

The invention relates to solid secondary lithium electrochemical cells. In particular, cells, in which a solid, solvent-containing electrolyte is interposed between an anode and a cathode: the electrolyte comprises a solvent, an inorganic ion salt and a solid polymeric matrix. More particularly, the invention relates to cells in which the cathode active material is a physical mixture of intercalation compounds consisting of $Li_xMn_2O_4$ (spinel) and at least one lithiated oxide selected from the group consisting of $Li_xNiO_2$ and $Li_xCoO_2$, wherein $0 < x \leq 2$. The improvement produced by use of physical mixtures of these metal oxides is a smooth voltage profile during discharge, substantially without inflections and discontinuities.

In another aspect of the invention, the anode comprises a carbon material, more particularly, a mixture of at least two carbon materials selected from the group consisting of carbon black, coke and graphite. The improvement produced by the use of mixture of carbon phases is increased charge capacity of the cell and a smoothing of the voltage profile.

BRIEF DESCRIPTION OF THE DRAWINGS

FIG. 1 displays the differential capacity during discharge vs. cell voltage of a solid, secondary lithium cell composed of a solid electrolyte, a lithium metal anode and a cathode whose cathode-active materials consist of a physical mixture of $Li_xMnO_4$ and $Li_xCoO_2$ in 1:1 weight ratio.

FIG. 2 displays the differential capacity during discharge vs. cell voltage simulated for the cell of FIG. 1 from $Li_xMn_2O_4$/electrolyte/Li cell data and $Li_xCoO_2$/electrolyte/Li cell data.

FIG. 3 displays the cumulative capacity of the cell of FIG. 1 vs. the cell voltage over a complete charge/discharge cycle.

DETAILED DESCRIPTION OF PREFERRED EMBODIMENTS OF THE INVENTION

The invention is directed to certain solid secondary lithium cells containing a composite cathode which is a physical mixture of cathode active materials. The mixture comprises $Li_xMn_2O_4 (0 < x \leq 2)$ and at least one other lithiated metal oxide. Preferably, the anode is composes of a compatible anodic carbon material.

Prior to describing the invention in further detail, the key terms are defined below.

Definitions

The term "a solid lithium secondary cell or battery" refers to a composite electrochemical cell comprising a lithium anode; a solid, solvent and inorganic ion-containing electrolyte; and a compatible anode; which cell is capable of repeated charge-discharge cycles; and a battery comprising two or more such cells. Typically, the solid, solvent-containing electrolyte comprises a solid polymeric matrix hereinbelow defined.

The term "cycle" refers to a combined charge one-half cycle and a discharge one-half cycle, whereby the cell or battery takes in and stores electrical energy in a charge one-half cycle and releases electrical energy in a discharge one-hair cycle.

The term "charge capacity" herein denoted Q, refers to the maximum charge measured in ampere hours, which the cell or battery is capable of achieving under the ambient charging conditions and procedures.

The solid, solvent containing electrolyte comprises an electrolyte solvent, an inorganic ion salt, and a solid polymeric matrix.

The term "electrolyte solvent" (or "solvent") refers to the solvent (i.e., plasticizer) included in the composite electrode and the solid electrolyte for the purposes of solubilizing salts during operation of electrochemical cells. The solvent can be any low voltage aprotic polar solvent. Preferably, these materials are characterized by a boiling point greater than about 85° C. In this regard, low volatility for the electrolyte solvent simplifies manufacture of the electrolyte and improves the shelf life of the resulting battery. Representative examples of suitable electrolyte solvents include, by way of example, propylene carbonate, ethylene carbonate, gamma-butyrolactone, tetrahydrofuran, glyme, diglyme, triglyme, tetraglyme, ctimethylsulfoxide, dioxylane, sulfolane, and the like, and mixtures thereof. A preferred solvent is a mixture of an organic carbonate and triglyme, with a 4:1 weight ratio mixture of propylene carbonate to triglyme being particularly preferred, as disclosed in U.S. Pat. application Ser. No. 07/918,509, filed on Jul. 22, 1992 which application is incorporated herein by reference in its entirety.

If the solid matrix forming monomer or partial polymer thereof employed in either of the solid electrolyte or the composite electrode is cured or further cured by radiation polymerization to form the solid matrix, the solvent should be radiation inert at least up to the levels of radiation employed. If the solid matrix forming monomer or partial polymer thereof is cured or further cured by thermal polymerization, the solvent should be thermally inert up to the temperatures of thermal polymerization. Additionally, the solvent should not scavenge free radicals.

The term "inorganic ion salt" refers to any ion conducting inorganic salt which is suitable for use in a solid electrolyte. Representative examples are alkali metal salts of less mobile anions of weak bases having a large anionic radius. Examples of such anions are I—, Br—, SCN—, ClO—4, BF4—, PF6—, AsF6—, CF3COC—), CF3SO3—, etc. Specific examples of suitable inorganic ion salts include $LiClO_4$, $LiI$, $LiSCN$, $LiBF_4$, $LiAsF_6$, $LiCF_3SO_3$, $LiPF_6$, $Li[N(SO_2CF_3)_2]$, $Li[C(SO_2CF_3)_3]$, $NaI$, $NaSCN$, $KI$ and the like. The inorganic ion salt preferably contains at least one atom of Li, Na, K or Mg.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix should be ion-conducting. Preferably, the solid matrix is capable of ionically conducting inorganic cations (e.g., alkali ions as defined above). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid $\beta$-alumina, sliver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomer form can be polymerized to form solid polymeric matrices. Suitable solid matrix forming monomers are well known in the art and the particular monomer employed is not critical.

Preferably, the solid matrix forming monomers contain hereto atom functionalities capable of forming donor acceptor bonds with the cations of the alkali salt so as to render the solid matrix ion-conducting (i.e., able to conduct the alkali cations). Ion-conducting hereto atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253 and incorporated herein by reference), acrylic acid ($CH_2=CHCOOH$), chloroacrylic acid ($ClCH=CHCOOH$), bromoacrylic acid ($BrCH=CHCOOH$), crotonic acid ($CH_3CH=CHCOOH$), propylene ($CH_3CH=CH_2$), ethylene ($CH_2=CH_2$) and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et al., Proc. Int. Power Sources Syrup., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones.

Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "lithium anode" refers to anodes comprising lithium, including by way of example, metallic lithium, lithium alloys, such as alloys of lithium with aluminum, mercury, zinc, and the like, and intercalation based anodes containing lithium such as those based on carbon, vanadium oxides, tungsten oxides, and the like.

The term "cathode" refers to an electrode containing a compatible cathodic material which functions as a positive pole (cathode) in a solid, secondary electrolytic cell and which is capable of being recharged (recycled) and which, when employed with the lithium anode, provides a fabricated electrolytic cell potential of at least about 2 volts.

The term "composite electrode" refers to cathodes and anodes wherein the cathode is comprised of materials other than cathodic materials and the anode is comprised of materials other than anodic materials. Typically, the composite contains a polymer which acts to bind the composite materials together. This polymer is derived from a solid matrix forming monomer or partial polymer thereof.

Composite cathodes are well known in the art. For example, a composite cathode can comprise a compatible cathodic material, a conductive material, an electrolytic solvent, an alkali salt, and a solid polymeric matrix which is derived from a solid matrix forming monomer or partial polymer thereof.

Composite anodes are also well known in the art. For example, a composite anode can comprise a compatible intercalation anodic material, an electrolytic solvent and a solid polymeric matrix which is derived from a solid matrix forming monomer or partial monomer thereof.

The term "physical mixture" refers to substances which are mixed but not chemically combined. Physical mixtures are non-homogeneous, even if particulate, and may be separated mechanically.

The term "mixed metal oxides" e.g. $LiNi_xCo_{1-x}O_2$, refers to compounds which are formally derived from individual metal oxides but contain two or more metal species often in an arbitrary ratio. The mixed metal oxides are chemical reaction products generally formed by heating mixture of the appropriate oxides. The mixed metal oxides are not physical mixtures but are true examples of chemical mixtures, i.e. chemical compounds of arbitrary ratio. Their structures are determined by close packing of the oxide ions, and the metal ions occupy octahedral or tetrahedral holes between the oxygen atoms. The mixed metal oxides are identifiable by powder x-ray diffraction patterns, see U.S. Pat. No. 4,770,960, the disclosure of which is incorporated by reference.

The term "$Li_xMn_2O_4$(spinel), $0<x\leq 2$" refers to an intercalation compound having at least 2 intercalation plateaus, i.e. the $Mn_2O_4$ spinel lattice intercalates 1 lithium ion reversibly at 4.1 volts vs. $Li/Li^+$ to form $LiMn_2O_4$, and the latter intercalates a lithium ion reversibly at 2.9 volts to produce the composition $Li_2Mn_2O_4$. The use of the latter oxide as a starting cathode in a cell containing lithium as the anode has the net effect of doubling the specific capacity of the cell over that obtained from a $LiMn_2O_4$ cathode. The $Li_xMn_2O_4$ is made by methods well known to those of ordinary skill in the art, more recently reviewed and expanded by the Tarascon et al. publications referenced and incorporated herein above.

The term "lithiated metal oxides" refers to $Li_xNiO_2$ and $Li_xCoO_2 (0<x\leq 2)$. These oxides are generally made by the heating of physical mixtures of lithium carbonate and the appropriate metal carbonate, each of which is commercially available, at a lithium to metal atom ratio of 1:1. For example, lithium carbonate and cobalt carbonate powders are mixed in the aforementioned ratio and calcined in air at 900° C. for 5 hours to give the lithium cobalt oxide. The mixed metal oxides are made by so-treating mixtures of lithium, nickel and cobalt carbonates in atomic ratio 1:x: 1-x to produce $LiNi_xCo_{1-x}O_2$.

The term "compatible anodic carbon material" refers to anode active carbonaceous material which has a capacity for intercalating lithium. The carbonaceous material is selected from pyrolyzed carbon, coke made from petroleum or coal, calcined organic materials, carbon black, carbon fiber, graphite and other active carbon materials, as well as mixtures thereof, all of which are commercially available.

Methodology

The general method of constructing solid secondary lithium electrochemical cells is disclosed in U.S. patent application Ser. No. 08/077,489, filed Jun. 14, 1993, which is incorporated herein by reference in its entirety.

In the practice of the present invention the cathode powder comprises a mixture of $Li_xMn_2O_4$(spinel) and at least one lithiated metal oxide selected from the group consisting of $Li_xNiO_2$ and $Li_xCoO_2$, wherein $0<x\leq 2$, in weight ratio of from about 1:10 to 10:1, $Li_xMn_2O_4$:total lithiated metal oxide.

A cathode slurry for solvent casting onto a collector plate is formed by combining sufficient cathode powder with solvent and binder to provide for a final product with about 50-90 weight percent cathode active material. A solvent such as cyclohexane or toluene is mixed with about 88-96 weight percent cathode powder, about 2-6 weight percent binder and about 2-6 weight percent carbon black (from Chevron Chemical Company, San Ramon, Calif., under the name "Shawinigan Black"). The binder is polyvinylidene difluoride (PVDF) or ethylene propylene diene monomer (EPDM). A slurry, containing about 86% solids is casted onto the collector to the specified thickness and dried to a solid cathode laminated to the aluminum current collector as described.

The solid electrolyte is then coated onto the cathode before curing. The anode is a lithium foil as described, or preferably, a compatible anodic carbon material, and more preferably a composite anode comprising a mixture of at least two carbon materials selected from the group consisting of carbon black, carbon coke and graphite. The carbonaceous anodes are made by forming a particulate carbonaceous composition, preferably containing a major amount of graphitic carbon, with up to about 5 weight percent of EPDM or PVDF polymer binder. The composite electrodes are made by dissolving a small amount of binder in a solvent such as cyclohexane, and adding the appropriate amount of anodic carbon material as a particulate to the solution. The resulting slurry is deposited onto a current collector and dried at about 160° C. for about 1.5-3 hours.

Utility

FIG. 1 shows the differential capacity of a sold secondary lithium cell of the present invention wherein the cathode comprises a 1:1 by weight physical mixture of $Li_xMn_2O_4$ and $Li_xCoO_2$, the anode is a metallic lithium anode, and the solid electrolyte is composed of a mixed solvent (triglyme and propylene carbonate) and $LiPF_6$ salt in a polyurethane-acrylate solid polymeric matrix (obtained from Henkel Corp., Ambler, Pa.).

FIG. 2 is a simulation of the differential capacity curve of a 1:1 $Li_xMn_2O_4/Li_xCoO_2$ cathode obtained by the addition of normalized differential capacity curves for the individual cathode materials $Li_xMn_2O_4$ and $Li_xCoO_2$ in identical solid secondary lithium electrochemical cells, as heretofore described, and otherwise identical to the cell of FIG. 1.

The composite cathodes of the present invention provide a continuous and smooth cell voltage without inflections as is evident in the data of FIG. 3, showing a complete charge/discharge cycle for a cell whose active cathode material consists of a 1:1 by weight physical mixture of $Li_xMn_2O_4$ and $Li_xCoO_2$ as heretofore described.

The cell capacity is proportional to the area under the curve of the differential cell capacity dQ/dV vs. voltage. The peaks in the differential capacity plots of FIGS. 1 and 2 indicate the several voltage plateaus introduced by the use of the mixed cathode active materials. The numerous voltage plateaus tend to smooth the voltage profile of the cell. Comparison of FIGS. 1 and 2 directly indicates that an increase in cell capacity is obtainable from the use of the physical mixture of the present invention as the cathode active materials. The additional capacity obtained is especially useful in cells utilizing anodic carbon anodes.

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the following claims.

What is claimed is:

1. A solid secondary lithium electrochemical cell comprises:

a solid solvent containing electrolyte interposed between an anode composed of anodic material and a cathode composed of cathodic material;

wherein said electrolyte comprises a solvent; an inorganic ion salt and a solid polymeric matrix; and wherein said cathode comprises a physical mixture of $Li_xMn_2O_4$(spinel) and at least one lithiated metal oxide selected from the group consisting of $Li_xNiO_2$ and $Li_xCoO_2$, wherein $0<x\leq2$.

2. A solid secondary lithium cell according to claim 1 wherein said anode comprises an anodic carbon material.

3. A solid secondary lithium cell according to claim 2 wherein said anodic carbon material comprises a mixture of at least two carbon materials selected from the group consisting of carbon black, carbon coke and graphite.

4. A solid secondary lithium cell according to claim 1 wherein said cathode comprises $Li_xMn_2O_4(0<x\leq2)$ and $Li_xNiO_2$.

5. A solid secondary lithium cell according to claim 1 wherein said cathode comprises $Li_xMn_2O_4(0<x\leq2)$ and $Li_xCoO_2$.

6. A battery comprising at least two of the cells of claim 1.

7. A solid secondary lithium cell according to claim 1 wherein the anode comprises an intercalation anode.

8. A solid secondary lithium cell according to claim 5 wherein the anode comprises an intercalation anode.

9. A solid secondary lithium cell according to claim 1 wherein the anode comprises a lithium containing intercalation based anode that is based on carbon, vanadium oxide or tungsten oxide.

10. A solid secondary lithium cell according to claim 5 wherein the anode comprises a lithium containing intercalation based anode that is based on carbon, vanadium oxide or tungsten oxide.

* * * * *